(12) United States Patent
Ishihara et al.

(10) Patent No.: US 8,709,641 B2
(45) Date of Patent: Apr. 29, 2014

(54) MICROPOROUS MEMBRANES AND METHODS FOR PRODUCING AND USING SUCH MEMBRANES

(75) Inventors: Takeshi Ishihara, Nasushiobara (JP); Satoshi Miyaoka, Nasushiobara (JP); Koichi Kono, Nasushiobara (JP); Donna J. Crowther, Seabrook, TX (US); Patrick Brant, Seabrook, TX (US); Kazuhiro Yamada, Nasushiobara (JP)

(73) Assignee: Toray Battery Separator Film Co., Ltd. (JP)

( * ) Notice: Subject to any disclaimer, the term of this patent is extended or adjusted under 35 U.S.C. 154(b) by 326 days.

(21) Appl. No.: 13/259,195

(22) PCT Filed: Mar. 5, 2010

(86) PCT No.: PCT/US2010/026423
§ 371 (c)(1),
(2), (4) Date: Sep. 23, 2011

(87) PCT Pub. No.: WO2010/114673
PCT Pub. Date: Oct. 7, 2010

(65) Prior Publication Data
US 2012/0028101 A1    Feb. 2, 2012

Related U.S. Application Data

(60) Provisional application No. 61/164,817, filed on Mar. 30, 2009, provisional application No. 61/164,833, filed on Mar. 30, 2009, provisional application No. 61/164,827, filed on Mar. 30, 2009, provisional application No. 61/164,824, filed on Mar. 30, 2009, provisional application No. 61/177,060, filed on May 11, 2009, provisional application No. 61/220,094, filed on Jun. 24, 2009.

(30) Foreign Application Priority Data

May 25, 2009  (EP) .................................... 09160964
May 25, 2009  (EP) .................................... 09160965
May 25, 2009  (EP) .................................... 09160966
May 25, 2009  (EP) .................................... 09160967
Jun. 25, 2009  (EP) .................................... 09163698
Aug. 19, 2009 (EP) .................................... 09168194

(51) Int. Cl.
   *H01M 2/18*    (2006.01)

(52) U.S. Cl.
   USPC .......................................................... 429/144

(58) Field of Classification Search
   None
   See application file for complete search history.

(56) References Cited

U.S. PATENT DOCUMENTS 5,084,534 A   1/1992  Welborn, Jr. et al.
6,824,865 B1  11/2004 Funaoka et al.
(Continued)

FOREIGN PATENT DOCUMENTS

EP  1 870 430   12/2007
EP  1 947 138    7/2008
(Continued)

OTHER PUBLICATIONS

Sun, T. et al., "Effect of Short Chain Branching on the Coil Dimensions of Polyolefins in Dilute Solution," *Macromolecules*, 2001, vol. 34, No. 19, pp. 6812-6820 (1 page Abstract).

*Primary Examiner* — Patrick Ryan
*Assistant Examiner* — Jose Colucci Rios
(74) *Attorney, Agent, or Firm* — DLA Piper LLP (US)

(57) ABSTRACT

A microporous membrane comprising layers, wherein at least one layer comprises a first polymer having a Tm in the range of 115.0° C. to 130.0° C. and an Mw of from $5.0\times10^3$ to $4.0\times10^5$, and the membrane has a shutdown temperature$\leq$130.5° C. and a rupture temperature$\geq$170.0° C.

18 Claims, 1 Drawing Sheet

(56) References Cited

U.S. PATENT DOCUMENTS

| | | | |
|---|---|---|---|
| 2005/0098913 A1* | 5/2005 | Funaoka et al. | 264/41 |
| 2008/0057388 A1* | 3/2008 | Kono et al. | 429/144 |
| 2008/0057389 A1* | 3/2008 | Kono et al. | 429/144 |
| 2008/0193833 A1* | 8/2008 | Ohashi et al. | 429/129 |
| 2009/0008816 A1* | 1/2009 | Takita et al. | 264/204 |

FOREIGN PATENT DOCUMENTS

| | | |
|---|---|---|
| JP | 2002-338730 | 11/2002 |
| WO | 97/23554 | 7/1997 |
| WO | 2007/052663 | 5/2007 |
| WO | 2007/132942 | 11/2007 |
| WO | 2008/016174 | 2/2008 |

* cited by examiner

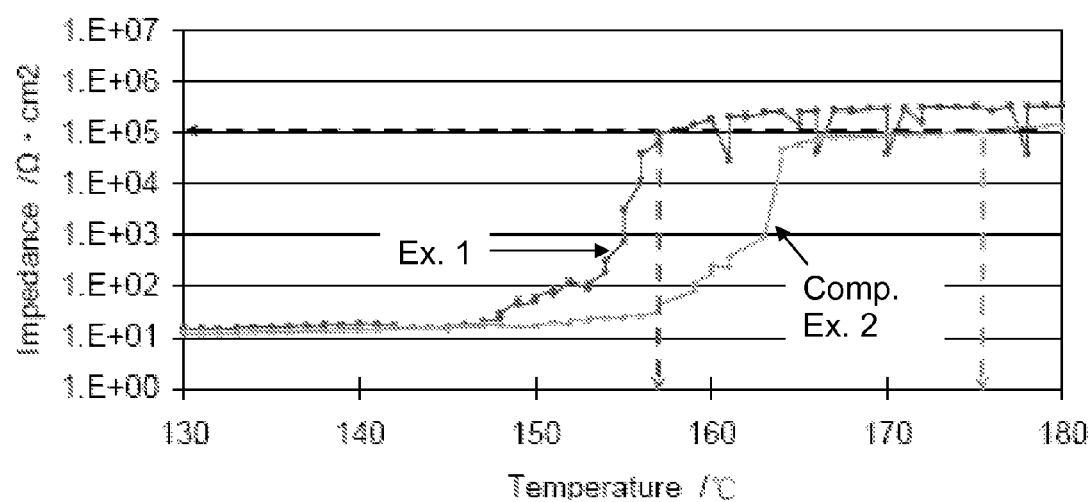

MICROPOROUS MEMBRANES AND METHODS FOR PRODUCING AND USING SUCH MEMBRANES

CROSS-REFERENCE TO RELATED APPLICATIONS

This application claims priority from U.S. Provisional Application Ser. No. 61/177,060 filed May 11, 2009, and EP 09163698.5 filed Jun. 25, 2009; U.S. Provisional Application Ser. No. 61/164,824 filed Mar. 30, 2009, and EP 09160964.4 filed May 25, 2009; U.S. Provisional Application Ser. No. 61/164,817 filed Mar. 30, 2009, and EP 09160965.1 filed May 25, 2009; U.S. Provisional Application Ser. No. 61/164,833 filed Mar. 30, 2009 and EP 09160966.9 filed May 25, 2009; U.S. Provisional Application Ser. No. 61/164,827 filed Mar. 30, 2009 and EP 09160967.7 filed May 25, 2009; U.S. Provisional Application Ser. No. 61/220,094 filed Jun. 24, 2009 and EP 09168194.0 filed Aug. 19, 2009, the contents of each of which are incorporated by reference in their entirety.

FIELD OF THE INVENTION

The invention relates to a multilayer, microporous membrane, wherein at least one layer comprises a first polymer having a Tm in the range of 115.0° C. to 130.0° C. and an Mw of from $5.0 \times 10^3$ to $4.0 \times 10^5$, and the membrane has a shutdown temperature ≤130.5° C. and a rupture temperature ≥170.0° C. The invention also relates to a battery separator formed by such a multilayer, microporous membranes, and a battery comprising such a separator. Another aspect of the invention relates to a method for making the multilayer, microporous membrane, a method for making a battery using such a membrane as a separator, and a method for using such a battery.

BACKGROUND OF THE INVENTION

Microporous membranes can be used as battery separators in, e.g., primary and secondary lithium batteries, lithium polymer batteries, nickel-hydrogen batteries, nickel-cadmium batteries, nickel-zinc batteries, silver-zinc secondary batteries, etc. When microporous membranes are used as battery separators, particularly lithium ion battery separators, the membranes' performance significantly affects the properties, productivity and safety of the batteries. Accordingly, the microporous membrane should have suitable mechanical properties, heat resistance, permeability, dimensional stability, shutdown properties, meltdown properties, etc. It is desirable for the batteries to have a relatively low shutdown temperature and relatively high temperature stability for improved battery-safety properties, particularly for batteries that are exposed to high temperatures during manufacturing, charging, re-charging, overcharging, use, and/or storage. Improving separator permeability generally leads to an improvement in the battery's power and capacity. Low shutdown temperature is desired for improved battery safety, particularly when the battery is operated under overcharge conditions. Improved separator storage stability is desired because deterioration of separator at high temperature causes decreased battery voltage.

In general, multilayer microporous membrane separators produced from polypropylene can have an increased meltdown temperature. Such separators may include polyethylene in order to provide a relatively low shutdown temperature, particularly when the polyethylene has a significant amount of terminal unsaturation. See, for example, WO97-23554A and JP2002-338730A. Typically, shutdown temperatures are determined by increasing the temperature of the separator at a relatively slow rate to accurately observe the shutdown transition. But in a battery, heating may occur rapidly, for example during an overcharge. Under such conditions the shutdown response of such membranes under rapid heating conditions may not be satisfactory and the cell may experience relatively rapid heating to temperatures exceeding the separator shutdown temperature. If the separator cannot shutdown before the rupture temperature is reached, the battery can fail.

Thus, a separator that has a shutdown temperature lower than conventionally attainable while maintaining relatively high rupture characteristics would provide an increased margin of safety during such rapid heating conditions. Likewise, separators that have improved shutdown response under rapid heating conditions would be useful.

SUMMARY OF THE INVENTION

In one aspect, the invention relates to microporous membrane comprising layers, wherein at least one layer comprises a first polymer, particularly a polyolefin, having a Tm in the range of 115.0° C. to 130.0° C. and an Mw of from $5.0 \times 10^3$ to $4.0 \times 10^5$, and the membrane has a shutdown temperature ≤130.5° C. and a rupture temperature ≥170.0° C.

In another embodiment, the membrane includes at least a first layer including at least the first polymer and a second layer including at least polypropylene. In one such embodiment, the first polymer is an ethylene/α-olefin copolymer having a Tm of ranging from 121.0 to 125.0° C., and the membrane includes at least a second layer comprising polypropylene having an Mw≥$5.0 \times 10^5$ and a Tm≥150° C. Some such embodiments further include a third layer that also includes the first polymer, e.g., polyolefin having a Tm in the range of 115.0° C. to 130.0° C. or the ethylene/α-olefin copolymer, wherein the second layer is located between the first and third layers.

In another embodiment, the microporous membranes described shows improved shutdown response under simulated overcharge conditions. For instance, some such membranes attain a surface impedance of $1.0 \times 10^4$ (ohm)(cm$^2$) at a temperature ≤175° C., e.g., 150° C. to 160° C., when subjected to heating at a rate of 35° C./min.

In yet another embodiment, the invention provides a multilayer microporous membrane having a shutdown temperature ≤130.5° C. and a rupture temperature ≥170.0° C., the membrane comprising:

first and third layers individually comprising 20.0 wt. % to 30.0 wt. % of an ethylene/α-olefin copolymer having an Mw from $1.0 \times 10^4$ to $7.0 \times 10^4$, 45.0 wt. % to 70.0 wt. % of an polyethylene having an Mw≤$1.0 \times 10^6$, and 0.0 wt. % to 35.0 wt. % of a polyethylene having an Mw>$1.0 \times 10^6$; based on the weight of the first and third layers, respectively, and a second layer located between the first and third layers, comprising 20.0% to 80.0 wt. % of a polypropylene having an Mw of $1.1 \times 10^6$ and a heat of fusion >110.0 J/g, 0 wt. % to 10.0 wt. % of a polyethylene having an Mw>$1.0 \times 10^6$ and 20.0 wt. % to 70.0 wt. % of a polyethylene having an Mw≤$1.0 \times 10^6$, the weight percents being based on the weight of the second layer.

In another aspect, the invention relates to a method for producing a microporous membrane, comprising:

combining at least a first polymer and at least one first diluent, the first polymer comprising a polymer having a Tm in the range of from 115.0° C. to 130.0° C. and an Mw in the range of from $5.0 \times 10^3$ to $4.0 \times 10^5$;

combining at least a polypropylene and at least a second diluent, the polypropylene having an Mw<$1.0\times10^6$;

forming a multilayer extrudate therefrom having a first layer containing the first polyethylene, a second layer containing the third polyethylene, and a second layer located between the first and third layers containing the polypropylene; and removing at least a portion of the first, second, and third diluents from the multilayer extrudate to produce the membrane.

In one embodiment, the method further includes combining at least a third polymer comprising a polymer having a Tm in the range of from 115.0° C. to 130.0° C. and an Mw in the range of from $5.0\times10^3$ to $4.0\times10^5$ with at least one third diluent. In another such embodiment, the first polymer and third polymer include a polyolefin, e.g., an ethylene/a-olefin copolymer having the recited properties.

In another embodiment, the method comprises providing a multilayer microporous membrane wherein the first and third layers contain 3 to 50 wt. % of the polymer having a Tm in the range of from 115.0° C. to 130.0° C. and an Mw in the range of from $5.0\times10^3$ to $4.0\times10^5$, 0 to 25.0 wt. % of polyethylene having an Mw>$1.0\times10^6$, 40 to 97 wt. % of a polyethylene having an Mw≤$1.0\times10^6$, based on the total weight of polymer in the first and third layers respectively; and the second layer contains 15 to 40 wt. % of the polypropylene, and 0 to 10 wt. % of an independently selected polyethylene having an Mw>$1.0\times10^6$, and 50 to 85 wt. % of a polyethylene having an Mw≤$1.0\times10^6$, based on the total weight of polyolefin in the second layer, wherein the first, second and third diluents are the same.

In another embodiment, the invention relates to a microporous membrane produced by the preceding processes.

In yet another embodiment, the invention relates to a battery comprising an anode, a cathode, an electrolyte, and at least one battery separator located between the anode and the cathode, the battery separating comprising the microporous membrane of any of the preceding embodiments. The battery can be, e.g., a lithium ion primary or secondary battery. The battery can be used, for example, as a power source for a power tool such as a battery-operated saw or drill, or for an electric vehicle or hybrid electric vehicle.

BRIEF DESCRIPTION OF THE DRAWING

FIG. 1 compares the temperature at which a cell including an embodiment of the invention being heated at a rate of 35° C./min. reaches an AC impedance of $1.0\times10^4$ (ohm)(cm$^2$) with that of a cell including a commercially available separator made by a dry process.

DETAILED DESCRIPTION OF THE INVENTION

Multilayer microporous membrane separators described herein provide an increased safety margin compared to conventional multilayer membrane separators. Safety may be further improved by providing a separator that shuts down relatively rapidly, as measured by the separator's impedance under rapid heating conditions.

In an embodiment, the multilayer, microporous membrane comprises at least two layers. One layer of the membrane includes a polymer having a Tm in the range of 115.0° C. to 130.0° C. and an Mw of from $5.0\times10^3$ to $4.0\times10^5$. The other layer can comprise e.g., a higher melting polymer such as polypropylene. The resulting membrane has a shutdown temperature ≤130.5° C. and a rupture temperature ≥170.0° C. In one embodiment, one layer comprises a polyolefin, particularly an ethylene/α-olefin copolymer having a Tm and Mw in the selected range and the other layer includes at least a polypropylene having an Mw≥$5.0\times10^5$ and a Tm≥150° C.

In certain embodiments, the multilayer, microporous membrane includes at least three layers wherein at least one layer contains a polymer having a Tm in the range of 115.0° C. to 130.0° C. In one such embodiment, the membrane includes a first and third with second layer therebetween; wherein the first and third layers comprise a polymer having a Tm in the range of 115.0° C. to 130.0° C. and an Mw of from $5.0\times10^3$ to $4.0\times10^5$ and the second layer comprises polypropylene. In such an embodiment, the first and third layers provide improved shutdown performance, while the second layer provides rupture resistance.

In embodiments of the inventions, the polymer having a Tm in the range of 115.0° C. to 130.0° C. and an Mw of from $5.0\times10^3$ to $4.0\times10^5$ has a narrow melting peak width to allow production of a membrane with relatively higher air permeability.

While the membrane will be described in terms of a three-layer membrane coextruded membrane, it is not limited thereto, and the description is no meant to foreclose coverage of two-layer membranes or membranes made by other methods, e.g., lamination.

[1] Composition and Structure of the Microporous Membrane

In an embodiment, the microporous membrane comprises: a first layer comprising a polymer composition P1 including at least a polymer having a Tm in the range of 115.0° C. to 130.0° C. and a weight average molecular weight ("Mw") of from $5.0\times10^3$ to $4.0\times10^5$, a third layer comprising a polymer composition P3 including at least a polymer having a Tm in the range of 115.0° C. to 130.0° C. and an Mw of from $5.0\times10^3$ to $4.0\times10^5$ and a second layer comprising a polymer composition P2 and located between the first and third layers. The thickness of the second layer is generally in the range of about 4% to about 21%, or from about 5% to about 15%, or from 7% to about 10% of the combined thickness of the first, second and third layers. In an embodiment, the first and third layers comprise one or more polyethylenes in a major amount, while the second layer includes one or more polypropylenes along with one or more polyethylenes.

In another embodiment, the microporous membrane comprises:

a first layer comprising P1, wherein P1 comprises a polyethylene homopolymer or an ethylene/α-olefin copolymer having a Tm in the range of 115.0° C. and 130.0° C. and an Mw in the range of $5.0\times10^3$ to $4.0\times10^5$, a third layer comprising P3, wherein P3 comprises a polyethylene homopolymer or an ethylene/α-olefin copolymer, having a Tm in the range of 115.0° C. and 130.0° C. and an Mw in the range of $5.0\times10^3$ to $4.0\times10^5$. P1 and P3 may optionally also include a polyethylene having an Mw $1.0\times10^6$ and a melting peak 131.0° C. In addition, P1 and P3 can include a polyethylene having an Mw≥$1.0\times10^6$. The Mw of the resulting P1 and P3 composition is not critical, and can range, e.g., from about $1.0\times10^4$ to about $1.0\times10^7$, or from about $1.0\times10^5$ to about $5.0\times10^6$, or from about $2.0\times10^5$ to about $3.0\times10^6$. Such embodiments include a second layer comprising P2 wherein P2 comprises a polypropylene having an Mw≥$5.0\times10^5$ and a Tm≥150° C. P2 may optionally also include a polyethylene having an Mw≤$1.0\times10^6$, typically having a melting peak ≥131.0° C. In addition, P2 can include a polyethylene having an Mw>$1.0\times10^6$. The second layer is located between the first and third layers. The thickness of the second layer is generally in the range of about 4% to about 21%, or from about 5% to about 15%, or from 7% to about 10% of the combined thickness of the first, second and third layers. In an embodiment, the first and third layers comprise one or more polyethylenes in a major amount, while the second layer includes one or more polypropylenes along with one or more polyethylenes.

In an embodiment, the microporous membrane comprises three layers, at least one of which comprises a polymer having a Tm in the range of 115.0° C. to 130.0° C. and an Mw of from $5.0 \times 10^3$ to $4.0 \times 10^5$, wherein the first and third layers (also called the "surface" or "skin" layers) comprise outer layers of the membrane and the second layer is an intermediate layer (or "core" layer) located between the first and third layers. In a related embodiment, the microporous membrane can comprise additional layers, i.e., in addition to the two skin layers and the core layer. For example, the membrane can contain additional core layers. The membrane can be a coated membrane, i.e., it can have one or more additional layers on or applied to the first and second layers. While it is not required, the core layer can be in planar contact with one or more of the skin layers in a stacked arrangement such as A/B/A with face-to-face stacking of the layers. The membrane can be referred to as a "polyolefin membrane" when the membrane contains polyolefin. While the membrane can contain polyolefin only, this is not required, and it is within the scope of the invention for the polyolefin membrane to contain polyolefin and materials that are not polyolefin. In an embodiment, the membrane consists of polyolefin or consists essentially of polyolefin. Certain embodiments P1 and P3 individually consist or consist essentially of polyethylene and P2 consists or consists essentially of polypropylene and polyethylene.

Although it is not required, the first and third layers can have the same thickness and composition. The combined thickness of the first and third layers can optionally be in the range of 79% to 96% of the total thickness of the multilayer, microporous membrane. For example, the thickness can be in the range of 80% to 90%, or 85% to 90%. The amount of polymer having a Tm in the range of 115.0° C. and 130.0° C. and an Mw in the range of $5.0 \times 10^3$ to $4.0 \times 10^5$ in the first layer or third layer can be independently selected to be in the range of 3.0 to 50.0 wt. %, or 10.0 to 40.0 wt. %, or 15.0 to 30.0 wt. %, based on the weight of the respective first or third layer. The amount of polypropylene in P2 of the second layer is generally ≤40.0 wt. %, or from 5.0 to 35.0 wt. %, or 10.0 to 30.0 wt. % based on the weight of the second layer. The first and third layers each individually further comprise from 40.0 wt. % to 97.0 wt. %, based on the weight of the respective first layer or third layer, of a polyethylene having an Mw≤$1.0 \times 10^6$ and from 0 wt. % to 25.0 wt. % of polyethylene having a Mw>$1.0 \times 10^6$; and the second layer further comprises polyethylene. In some such embodiments, the second layer comprises 15.0 to 40.0 wt. % polypropylene, 0 wt. % to 10.0 wt. % of polyethylene having an Mw>$1.0 \times 10^6$, and 50.0 wt. % to 85.0 wt. % of polyethylene having an Mw≤$1.0 \times 10^6$, the weight percents being based on the weight of the second layer.

[2] Materials Used to Produce the Multilayer, Microporous Membrane

The polymer compositions P1, P2, and P3 comprise one or more polymers, particularly polyolefins, e.g., polyethylene, polypropylene, including polyethylene and polypropylene copolymers. The term polyethylene as used herein refers to a polyolefin homopolymer or copolymer containing recurring units derived from ethylene. Such polyethylenes include but are not limited to polyethylene homopolymer and/or copolymer wherein at least 85% (by number) of the recurring units are derived from ethylene. The term polypropylene as used herein refers to a polyolefin homopolymer or copolymer containing recurring units derived from propylene. Such polypropylenes include but are not limited to polypropylene homopolymer and/or copolymer wherein at least 85% (by number) of the recurring units are derived from propylene. Such polyethylenes and polypropylenes can be a mixture or reactor blend of individual polyethylenes or polypropylenes, respectively.

Generally, P1 and/or P3 comprise a first polymer having Tm in the range of from 115.0° C. to 130.0° C., and an Mw in the range of from $5.0 \times 10^3$ to $4.0 \times 10^5$. When the Tm is ≤115.0° C., it is more difficult to produce a thermally-stable membrane (one having low heat shrinkage, for example) without also reducing membrane permeability. Thermal treatment temperatures (e.g., heat setting temperatures)>115.0° C. are generally used to produce thermally-stable membranes, and membrane permeability decreases when the heat setting temperature is ≥the polymer's Tm. When the first polymer's Tm is >131.0° C., it is more difficult to produce a microporous membrane having both high air permeability and low shutdown temperature. It has been discovered that when the first polymer's Mw is significantly <$5.0 \times 10^3$ or Mw is significantly >$4.0 \times 10^5$, it is more difficult to produce a microporous membrane having good air permeability even when Tm is relatively high, e.g., in the range of 125° C. to 130° C., or greater.

In an embodiment, the first polymer comprises a polyethylene homopolymer or copolymer. Some useful polyethylene homopolymers and copolymers have an Mw in the range of from $8.0 \times 10^3$ to $2.0 \times 10^5$. In one embodiment, the polyethylene homopolymer or copolymer has an Mw in the range of from $1.0 \times 10^4$ to $1.0 \times 10^5$ or from $1.0 \times 10^4$ to $7.0 \times 10^4$. Optionally, the ethylene-based polymer has a molecular weight distribution ("MWD" defined as Mw/Mn)≤100, for example, in the range of from 1.5 to 20, from about 1.5 to about 5, or from about 1.8 to about 3.5.

In an embodiment, the polyethylene copolymer comprises a copolymer of ethylene and a comonomer such as α-olefin. The comonomer is generally present in a relatively small amount compared to the amount of ethylene. For example, the comonomer amount is generally less than 10% by mol. based on 100% by mol. of the copolymer, such as from 1.0% to 5.0% by mol. The comonomer can be, for example, one or more of propylene, butene-1, pentene-1, hexene-1,4-methylpentene-1, octene-1, vinyl acetate, methyl methacrylate, styrene, or other monomers. Such a polymer or copolymer can be produced using any suitable catalyst, including a single-site catalyst. For example, the polymer can be produced according to the methods disclosed in U.S. Pat. No. 5,084,534 (such as the methods disclosed therein in examples 27 and 41), which is incorporated by reference herein in its entirety.

In an embodiment, the amount of the polyethylene homopolymer or copolymer can be, e.g., ≥1.0 wt. %, based on the total weight of polymer used to produce the membrane, such as from about 1.0 wt. % to 30.0 wt. % or 1.0 wt. % to 20.0 wt. %, e.g., about 4.0 wt. % to 17.0 wt. %, or about 8.0 wt. % to about 13.0 wt. %.

Tm is measured in accordance with JIS K7122 as follows. A sample of the first polyethylene is prepared as a 0.5-mm-thick molding that is melt-pressed at 210° C. and then stored for about 24 hours while exposed to a temperature of about 25° C. The sample is then placed in a sample holder of a differential scanning calorimeter (Pyris Diamond DSC available from Perkin Elmer, Inc.) and exposed to a temperature of 25° C. in a nitrogen atmosphere. The sample is then exposed to an increasing temperature (the first heating cycle) at a rate of 10° C./minute until a temperature of 230° C. is reached. The sample is exposed to the 230° C. temperature for 1 minute and then exposed to a decreasing temperature at a rate of 10° C./minute until a temperature of 30° C. is reached. The sample is exposed to the 30° C. temperature for 1 minute, and is then exposed to an increasing temperature at a rate of 10° C./minute (the second heating cycle) until a temperature of 230° C. is reached. The DSC records the amount of heat flowing to the sample during the second heating cycle. Tm is the temperature of the maximum heat flow to the sample as recorded by the DSC in the temperature range of 30° C. to 200° C. Polyethylene may show secondary melting peaks adjacent to the principal peak, and/or the end-of-melt transition, but for purposes herein, such secondary melting peaks are considered together as a single melting point, with the highest of these peaks being considered the Tm.

In an embodiment, the polyethylene homopolymer or copolymer has a Tm in the range of from 120.0° C. to 128.0° C., such as 120.0° C. to 126.0° C., or 120.5° C. to 124.5° C., or 121.0° C. to 124.0° C. In another embodiment, the polyethylene homopolymer or copolymer has Tm in the range of from 122.0° C. to 126.0° C.

P1, P2, and/or P3 may also include a high density polyethylene (HDPE) having a Tm>130° C., an Mw in the range of from about $2.0 \times 10^5$ to about $0.95 \times 10^6$, an MWD in the range of from about 2 to about 100. Particular such HDPEs can have a terminal unsaturation amount of less than 0.20 per 10,000 carbon atoms. In an embodiment, an HDPE with an Mw in the range of from about $2.0 \times 10^5$ to about $9 \times 10^5$, for example about $4 \times 10^5$ to about $6 \times 10^5$, and an MWD of from about 3 to about 10 is selected. In an embodiment, an HDPE having an amount of terminal unsaturation ≤0.1 per 10,000 carbon atoms, or ≤0.10 per 10,000 carbon atoms, e.g., in the range of 0.05 to 0.14 per 10,000 carbon atoms (e.g., below the detection limit of the measurement) is selected.

Alternatively, P1, P2, and/or P3 can include an HDPE having a Tm>130° C., an Mw in the range of from about $2.0 \times 10^5$ to about $0.95 \times 10^6$, an MWD in the range of from about 2 to about 100, and having a terminal unsaturation amount ≥0.20 per 10,000 carbon atoms. In an embodiment, the HDPE has an amount of terminal unsaturation ≥0.30 per 10,000 carbon atoms, or ≥0.50 per 10,000 carbon atoms, e.g., in the range of 0.7 to 10 per 10,000 carbon atoms. A non-limiting example of the HDPE for use herein is one having an Mw in the range of from about $3.0 \times 10^5$ to about $7.0 \times 10^5$, for example about $7.0 \times 10^5$, and an MWD of from about 4 to about 50.

HDPEs useful herein can be polyethylene homopolymer or copolymers, such as, for example, one containing a small amount, e.g., ≤5 mol. %, of one or more α-olefin comonomers. The α-olefin comonomers, which are not ethylene, are preferably propylene, butene-1, pentene-1, hexene-1,4-methylpentene-1, octene-1, vinyl acetate, methyl methacrylate, or styrene or combinations thereof. The polymer can be produced, e.g., in a process using a Ziegler-Natta or single-site polymerization catalyst, but this is not required. The amount of terminal unsaturation can be measured in accordance with the procedures described in PCT Patent Publication No. WO97/23554, for example.

In some embodiments, P1, P2, and/or P3 may also include an ultra-high molecular weight polyethylene (UHMWPE) having an Mw of from about $1.0 \times 10^6$ to about $5.0 \times 10^6$ and an MWD of from about 2 to about 100. A non-limiting example of such an UHMWPE for use herein is one that has an Mw of from about $1.0 \times 10^6$ to about $3.0 \times 10^6$, for example about $2.0 \times 10^6$, and an MWD of from about 2 to about 50, preferably about 4 to 15. UHMWPEs useful herein include polyethylene homopolymer or copolymers, such as, for example, copolymers containing a small amount, e.g., ≤about 5 mol. %, of one or more α-olefin comonomers. The α-olefin comonomers, which are not ethylene, can be, for example, propylene, butene-1, pentene-1, hexene-1,4-methylpentene-1, octene-1, vinyl acetate, methyl methacrylate, or styrene or combinations thereof. Such copolymer can be produced using a single-site catalyst, Zeigler-Natta catalyst or by other polymerization method.

P2 generally includes a polypropylene, preferably a polypropylene having an Mw greater than about $5.0 \times 10^5$, typically greater than $1.0 \times 10^6$. In particular embodiments, the polypropylene has an Mw ranging from about $7.5 \times 10^5$ to about $1.5 \times 10^6$. In an embodiment, the polypropylene has an MWD in the range of from about 1 to about 100, for example from about 1.5 to about 50 or about 2 to about 6; and/or a heat of fusion ("ΔHm")≥110 J/g, e.g., 112 J/g to 120 J/g, or 114 J/g to 116 J/g. ΔHm is measured using differential scanning calorimetry according to JIS K7122, as described in PCT Patent Publication No. WO2007/132942. The polypropylene can be, for example, one or more of (i) a propylene homopolymer or (ii) a copolymer of propylene and a comonomer. The copolymer can be a random or block copolymer. The comonomer can be, for example, one or more of α-olefins such as ethylene, butene-1, pentene-1, hexene-1, 4-methylpentene-1, octene-1, vinyl acetate, methyl methacrylate, and styrene, etc.; and diolefins such as butadiene, 1,5-hexadiene, 1,7-octadiene, 1,9-decadiene, etc. When used, the comonomer is present in a small amount, e.g., ≤10% by mol. based on 100% by mol. of the copolymer. Optionally, the polypropylene has one or more of the following properties: (i) the polypropylene is isotactic; (ii) the polypropylene has an elongational viscosity of at least about 50,000 Pa sec at a temperature of 230° C. and a strain rate of 25 $sec^{-1}$; (iii) the polypropylene has a melting peak (second melt) of at least about 160° C.; and/or (iv) the polypropylene has a Trouton's ratio of at least about 15 when measured at a temperature of about 230° C. and a strain rate of 25 $sec^{-1}$.

Mw and Mn of the polyethylenes are determined using a High Temperature Size Exclusion Chromatograph, or "SEC", (GPC PL 220, Polymer Laboratories), equipped with a differential refractive index detector (DRI). Three PLgel Mixed-B columns (available from Polymer Laboratories) are used. The nominal flow rate is 0.5 $cm^3$/min, and the nominal injection volume is 300 μL. Transfer lines, columns, and the DRI detector were contained in an oven maintained at 145° C. The measurement is made in accordance with the procedure disclosed in "*Macromolecules*, Vol. 34, No. 19, pp. 6812-6820 (2001)".

The GPC solvent used is filtered Aldrich reagent grade 1,2,4-Trichlorobenzene (TCB) containing approximately 1000 ppm of butylated hydroxy toluene (BHT). The TCB is degassed with an online degasser prior to introduction into the SEC. Polymer solutions are prepared by placing dry polymer in a glass container, adding the desired amount of above TCB solvent, then heating the mixture at 160° C. with continuous agitation for about 2 hours. The concentration of UHMWPE solution is 0.25 to 0.75 mg/ml. Sample solution is filtered off-line before injecting to GPC with 2 μm filter using a model SP260 Sample Prep Station (available from Polymer Laboratories).

The separation efficiency of the column set is calibrated with a calibration curve generated using a seventeen individual polystyrene standards ranging in Mp from about 580 to about 10,000,000, which is used to generate the calibration curve. The polystyrene standards are obtained from Polymer Laboratories (Amherst, Mass.). A calibration curve (logMp vs. retention volume) is generated by recording the retention volume at the peak in the DRI signal for each PS standard, and fitting this data set to a 2nd-order polynomial. Samples are analyzed using IGOR Pro, available from Wave Metrics, Inc.

The Mw and Mn of the polypropylene are determined by the method disclosed in PCT Patent Publication No. WO2007/132942, which is incorporated by reference herein in its entirety.

Diluents Used to Produce the Multilayer, Microporous Membrane

The first, second, and third diluents can be, e.g., one or more of aliphatic, alicyclic or aromatic hydrocarbons such as nonane, decane, decalin, p-xylene, undecane, dodecane; liquid paraffin; and mineral oil distillates having boiling points comparable to those of the preceding hydrocarbons. Although it is not required, the first, second, and third diluents can be the same. In an embodiment, the diluent is a non-volatile liquid solvent for the polymers used to produce the extrudate. The diluent's viscosity is generally in the range of from about 30 cSt to about 500 cSt, or from about 30 cSt to about 200 cSt, when measured at a temperature of 25° C. Although the choice of viscosity is not particularly critical, when the viscosity at 25° C. is less than about 30 cSt, the mixture of polymer and diluent might foam, resulting in difficulty in blending. On the other hand, when the viscosity is more than about 500 cSt, it can be more difficult to remove the solvent from the extrudate.

In an embodiment, the total amount of diluent in the extrudate can be in the range. e.g., of from about 25 wt. % to about 80 wt. %, or 60 wt. % to 80 wt. % based on the weight of the extrudate, with the balance being the polymer used to produce the extrudate. In other embodiments, the extrudate contains an amount of diluent in the range of about 65 wt. % to 80 wt. %, or 70 wt. % to 75 wt. %.

While the extrudate and the microporous membrane can contain inorganic species (such as species containing silicon and/or aluminum atoms), and/or heat-resistant polymers such as those described in PCT Patent Publication Nos. WO 2007/132942 and WO 2008/016174, these are not required. In an embodiment, the extrudate and membrane are substantially free of such materials. Substantially free in this context means the amount of such materials in the microporous membrane is less than 1 wt. %, based on the total weight of the polymer used to produce the extrudate.

The final microporous membrane generally comprises the polymers used to produce the extrudate. A small amount of diluent or other species introduced during processing can also be present, generally in amounts less than 1 wt. % based on the weight of the microporous polyolefin membrane. A small amount of polymer molecular weight degradation might occur during processing, but this is acceptable. In an embodiment, molecular weight degradation during processing, if any, causes the value of MWD of the polymer in the membrane to differ from the MWD of polymer before extrusion by no more than, e.g., about 10%, or no more than about 1%, or no more than about 0.1%.

[3] Production Method of Multilayer, Microporous Polyolefin Membrane

In an embodiment, the multilayer, microporous membrane comprises first and third microporous layers constituting the outer layers of the microporous membrane and a second layer situated between the first and third layers. The first layer is produced from P1, the second layer is produced from P2, and the third layer is produced from P3.

One method for producing a multilayer membrane comprises the steps of (a) combining at least P1 and at least one first diluent, P1 including at least a first polymer having Tm in the range of from 115.0° C. to 130.0° C., and an Mw in the range of from $5.0 \times 10^3$ to $4.0 \times 10^5$, and (b) combining at least P2 and at least one second diluent, the P2 preferably including a polypropylene. Where a three-layer membrane is desired, such a method includes combining at least P3 and at least a third diluent; the P3 including at least a first polymer having Tm in the range of from 115.0° C. to 130.0° C., and an Mw in the range of from $5.0 \times 10^3$ to $4.0 \times 10^5$.

The method also includes coextruding at least a portion of the combined P1 and first diluent through at least one die while co-extruding portions of at least combined P2 and the second diluent to form a multilayer extrudate having first and second layers containing the P1 and P2, respectively. When a three-layer membrane is formed, at least a portion of the combined P3 and third diluent is co-extruded through at least one die to form a third layer such that the second layer comprising P2 is located between the first and third layers; optionally the total amount of first polymer having Tm in the range of from 115.0° C. to 130.0° C., and an Mw in the range of from $5.0 \times 10^3$ to $4.0 \times 10^5$, is in the range of 1.0 to 50 wt. %, based on the weight of P1.

The method further includes removing at least a portion of the first, second, and third diluents from the extrudate to produce the multilayer, microporous membrane. The size of the membrane in the transverse (TD) direction can be called the first dry width and the size of the membrane in the machine direction (MD) can be called the first dry length. If desired the method can further comprise stretching the dried extrudate in the transverse direction from the first dry width to a second dry width, that is larger than the first dry width by a magnification factor in the range of from about 1.1 to 1.6, without changing the first dry length to produce a stretched membrane. The stretching can be conducted while exposing the dried extrudate to a temperature in the range of 116° C. to 130° C., for example from 118° C. to 129° C.

Additional optional steps that are generally useful in the production of microporous membranes can be used. For example, an optional extrudate cooling step, an optional extrudate stretching step, an optional hot solvent treatment step, an optional heat setting step, an optional cross-linking step with ionizing radiation, and an optional hydrophilic treatment step, etc., all as described in PCT Patent Publication Nos. WO2007/132942 and WO2008/016174 can be conducted, if desired. Neither the number nor order of these optional steps is critical.

(1) and (2) Combining Polymer and Diluent

The polymers as described above can be combined, e.g., by dry mixing or melt blending, and then this mixture can be combined with an appropriate diluent (or mixture of diluents) to produce a mixture of polymer and diluent. Alternatively, the polymer(s) and diluent can be combined in a single step. The first, second, and third diluents can be the same or different, e.g., the same or different liquid paraffin. When the diluent is a solvent for one or more of the polymers, the mixture can be called a polymeric solution. The mixture can contain additives, such as one or more antioxidant. In an embodiment, the amount of such additives does not exceed 1 wt. % based on the weight of the polymeric solution. The choice of mixing conditions, extrusion conditions, etc. can be the same as those disclosed in PCT Patent Publication No. WO 2008/016174, for example.

(3) Extrusion

In an embodiment, the combined polymer and diluent are conducted from an extruder to a die.

The extrudate or cooled extrudate (as hereinafter described) should have an appropriate thickness to produce, after the stretching steps, a final membrane having the desired thickness. For example, the extrudate can have a thickness in the range of about 0.2 mm to 2 mm, or 1.2 mm to 1.8 mm. Process conditions for accomplishing this extrusion can be the same as those disclosed in PCT Patent Publication Nos. WO 2007/132942 and WO 2008/016174, for example. MD is defined as the direction in which the extrudate is produced from the die. TD is defined as the direction perpendicular to both MD and the thickness direction of the extrudate. The extrudate can be produced continuously from a die, or it can be produced discontinuously as is the case in batch processing for example. The definitions of TD and MD are the same in both batch and continuous processing. While the extrudate can be produced by coextruding (a) the combined P1 (and optionally an HDPE and/or UHMWPE) with the first diluent, (b) P2 (and optionally an HDPE and/or UHMWPE) with the second diluent, and (c) P3 (and optionally HDPE and/or UHMWPE) with the third diluent, this is not required. Any method capable of producing a layered extrudate of the foregoing composition can be used, e.g., lamination. When lamination is used to produce the membrane, the diluent(s) can be removed before or after the lamination.

Optional Cooling

If desired, the multilayer extrudate can be exposed to a temperature in the range of 15° C. to 25° C. to form a cooled extrudate. Cooling rate is not particularly critical. For example, the extrudate can be cooled at a cooling rate of at least about 30° C./minute until the temperature of the extrudate (the cooled temperature) is approximately equal to the extrudate's gelation temperature (or lower). Process conditions for cooling can be the same as those disclosed in PCT Patent Publication Nos. WO 2008/016174 and WO 2007/132942, for example. In an embodiment, the cooled extrudate has a thickness in the range of 1.2 mm to 1.8 mm, or 1.3 mm to 1.7 mm.

Optional Stretching

If desired, the extrudate or cooled extrudate can be stretched in at least one direction (e.g., at least one planar direction, such as MD or TD) to produce a stretched extrudate. For example, the extrudate can be stretched simultaneously in the transverse and machine directions to a magnification factor in the range of 4 to 6 while exposing the extrudate to a temperature in the range of about 110° C. to 120° C., e.g., 112° C. to 118° C., or 113° C. to 115° C. Suitable stretching methods are described in PCT Patent Publication Nos. WO 2008/016174 and WO 2007/13294, for example. While not required, the MD and TD magnifications can be the same. In an embodiment, the stretching magnification is equal to 5 in MD and TD and the stretching temperature is 115.0° C. In another embodiment, the stretching magnification is equal to 5 in MD and TD and the stretching temperature is 113.0° C.

(4) Diluent Removal

At least a portion of the diluents are removed (or displaced) from the stretched extrudate to form the membrane. A displacing (or "washing") solvent can be used to remove (wash away, or displace) the diluent, as described in PCT Patent Publication Nos. WO 2008/016174 and WO 2007/132942, for example. It is not necessary to remove all diluent from the stretched extrudate, although it can be desirable to do so since removing diluent increases the porosity of the final membrane.

In an embodiment, at least a portion of any remaining volatile species, such as washing solvent, can be removed from the membrane at any time after diluent removal. Any method capable of removing the washing solvent can be used, including conventional methods such as heat-drying, wind-drying (moving air), etc. Process conditions for removing volatile species such as washing solvent can be the same as those disclosed in PCT Patent Publication Nos. WO 2008/016174 and WO 2007/132942, for example.

(5) Optional Stretching of the Membrane (Dry Orientation)

The membrane can be stretched to produce a stretched membrane. At the start of this step, the membrane has an initial size in MD (a first dry length) and an initial size in TD (a first dry width). The membrane is stretched in TD from the first dry width to a second dry width that is larger than the first dry width by a magnification factor in the range of from about 1.1 to about 1.6 (e.g., 1.20 to 1.40), without changing the first dry length. The stretching can be conducted while exposing the dried extrudate to a temperature in the range of 116° C. to 130° C., for example from 118° C. to 129° C. or 118° C. to 125° C. In an embodiment, the stretching is conducted at 118.5° C. to 119.0° C. The dry stretching is generally conducted while exposing the dried membrane to a temperature ≤Tm, e.g., in the range of from about Tcd-30° C. to Tm, where the relevant Tm for this step is the Tm of the polymer having the lowest Tm among the polymers used. In an embodiment where the membrane is a multilayer membrane having first and third layers comprising polyethylene and a second layer comprising polypropylene that is located between the first and third layers, the stretching temperature is generally conducted with the membrane exposed to a temperature in the range of from about 70 to about 135° C., for example from about 80° C. to about 132° C., e.g., 125° C. to 132° C. or 128° C. to 131° C.

As used herein, the term "first dry width" refers to the size of the dried extrudate in the transverse direction prior to the start of dry orientation. The term "first dry length" refers to the size of the dried extrudate in the machine direction prior to the start of dry orientation.

The stretching rate is preferably 1%/second or more in TD. The stretching rate is preferably 2%/second or more, more preferably 3%/second or more, e.g., in the range of 2%/second to 10%/second. Though not particularly critical, the upper limit of the stretching rate is generally about 50%/second.

(6) Optional Controlled Reduction of Width

Following the dry stretching, the dried membrane is subjected to a controlled reduction in width from the second dry width to a third width, the third dry width being in the range of from the first dry width to about 1.3 times larger than the first dry width. In an embodiment, the second dry width is 1.4 times larger and the third width is 1.2 times larger, each with respect to the first width. The width reduction generally conducted while the membrane is exposed to a temperature ≥Tcd−30° C., but less than Tm. The relevant Tm for this step is the Tm of the polymer having the lowest Tm among the polymers used. For example, during width reduction the membrane can be exposed to a temperature in the range of from about 70° C. to about 135° C., such as from about 116° C. to about 132° C., e.g., from about 118° C. to about 119° C. In an embodiment, the decreasing of the membrane's width is conducted while the membrane is exposed to a temperature that is lower than Tm. In an embodiment, the third dry width is in the range of from 1.0 times larger than the first dry width to about 1.6 times, e.g., 1.2 to 1.5 times, larger than the first dry width.

It is believed that exposing the membrane to a temperature during the controlled width reduction that is ≥the temperature to which the membrane was exposed during the TD stretching leads to greater resistance to heat shrinkage in the finished membrane.

Optional Heat-Setting

Optionally, the membrane is thermally treated (heat-set) one or more times after diluent removal, e.g., after dry stretching, the controlled width reduction, or both. It is believed that heat-setting stabilizes crystals and make uniform lamellas in the membrane. In an embodiment, the heat setting is conducted while exposing the membrane to a temperature in the range Tcd to Tm, where the relevant Tm for this step is the Tm of the polymer having the lowest Tm among the polymers used, e.g., a temperature in the range of from about 100° C. to about 135° C., such as from about 116° C. to about 125° C., or from about 118.5° C. to about 119.0° C. Generally, the heat setting is conducted for a time sufficient to form uniform lamellas in the membrane, e.g., a time in the range of 1 to 600 seconds. In an embodiment, the heat setting is operated under conventional heat-set "thermal fixation" conditions. The term "thermal fixation" refers to heat-setting carried out while maintaining the length and width of the membrane substantially constant, e.g., by holding the membrane's perimeter using tenter clips during the heat setting.

Optionally, an annealing treatment can be conducted after the heat-set step. The annealing is a heat treatment with no load applied to the membrane, and may be conducted by using, e.g., a heating chamber with a belt conveyer or an air-floating-type heating chamber. The annealing may also be conducted continuously after the heat-setting with the tenter slackened. During annealing the membrane can be exposed to a temperature in the range of Tm or lower, e.g., in the range from about 60° C. to about Tm −5° C. Annealing is believed to provide the microporous membrane with improved permeability and strength.

Optional heated roller, hot solvent, cross linking, hydrophilizing, and coating treatments can be conducted if desired, e.g., as described in PCT Patent Publication No. WO 2008/016174.

Optionally, an annealing treatment can be conducted before, during, or after the heat-setting. The annealing is a heat treatment with no load applied to the membrane, and can be conducted by using, e.g., a heating chamber with a belt conveyer or an air-floating-type heating chamber. The annealing can be conducted continuously, e.g., after the heat-setting with the tenter slackened. The temperature to which the membrane is exposed during annealing, (the "annealing temperature") can be, e.g., in a range from about 116° C. to 125° C. Annealing is believed to provide the microporous membrane with improved heat shrinkage and strength.

Optional heated roller, hot solvent, cross linking, hydrophilizing, and coating treatments can be conducted if desired, e.g., as described in PCT Patent Publication No. WO2008/016174.

[4] The Properties of a Multilayer, Microporous Membrane

In an embodiment, the multilayer, microporous polyethylene membrane has relatively low shutdown temperature of ≤130.5° C. and a rupture temperature ≥170.0° C. In an embodiment, the membrane can attain a surface impedance of $1.0 \times 10^4$ (ohm)(cm$^2$) at a temperature ≤175° C., e.g., 150 to 160° C., when subjected to heating at a rate of 35° C./min. The membrane generally has a thickness ranging from about 3 μm to about 200 μm, or about 5 μm to about 50 μm, and preferably 15 μm to about 30 μm. In addition, the membrane mentioned can have one or more of the following characteristics.

A. Shutdown Temperature of 130.5° C. or Less

The microporous membrane's shutdown temperature is measured by the method disclosed in PCT Patent Publication No. WO2007/052663, which is incorporated by reference herein in its entirety. According to this method, the microporous membrane is exposed to an increasing temperature (5° C./minute) while measuring the membrane's air permeability. The microporous membrane's shutdown temperature is defined as the temperature at which the microporous membrane's air permeability (Gurley Value) first exceeds 100,000 secs./100 cm$^3$. The microporous membrane's air permeability is measured according to JIS P8117 using an air permeability meter (EGO-1T available from Asahi Seiko Co., Ltd.). In an embodiment, the shutdown temperature is 126° C. to 130° C. In another embodiment the shutdown temperature is 128° C.

B. Normalized Air Permeability of ≤700 secs./100 cm$^3$/20 μm

In an embodiment, the membrane's normalized air permeability (Gurley value) is ≤700 secs./100 cm$^3$/20 μm. Normalized air permeability is measured according to JIS P8117, and the results are normalized to the permeability value of an equivalent membrane having a thickness of 20 μm using the equation $A = 20 \mu m * (X)/T_1$, where X is the measured air permeability of a membrane having an actual thickness $T_1$ and A is the normalized air permeability of an equivalent membrane having a thickness of 20 μm. Since the air permeability value is normalized to an equivalent membrane having thickness of 20 μm, the air permeability value is expressed in units of "secs./100 cm$^3$/20 μm". In an embodiment, the normalized air permeability is in the range of 400 secs./100 cm$^3$/20 μm to about 600 secs./100 cm$^3$/20 μm, or 150 secs./100 cm$^3$/20 μm to 375 secs./100 cm$^3$/20 μm.

C. Pin Puncture Strength of about 3000 mN/20 μm or More

The pin puncture strength (converted to the value at a 20-μm membrane thickness) is ≥3000 mN/20 μm. Pin puncture strength is defined as the maximum load measured when a microporous membrane having a thickness of $T_1$ is pricked with a needle of 1 mm in diameter with a spherical end surface (radius R of curvature: 0.5 mm) at a speed of 2 mm/second. The pin puncture strength may be normalized to a value at a membrane thickness of 1 μm using the equation $S_2 = 1 \mu m * (S_1)/T_1$, where $S_1$ is the measured pin puncture strength, $S_2$ is the normalized pin puncture strength, and $T_1$ is the average thickness of the membrane. In an embodiment, the pin puncture is ≥3000 mN/20 μm and in another embodiment, the pin puncture strength is ≥3750 mN/20 μm.

D. Porosity of about 25% to about 80%

In an embodiment, the membrane has a porosity ≥25%, e.g., in the range of about 25% to about 80%, or 30% to 60%. The membrane's porosity is measured conventionally by comparing the membrane's actual weight to the weight of an equivalent non-porous membrane of the same composition (equivalent in the sense of having the same length, width, and thickness). Porosity is then determined using the formula: Porosity %=100×(w2−w1)/w2, wherein "w1" is the actual weight of the microporous membrane and "w2" is the weight of an equivalent non-porous having the same size and thickness.

E. Rupture Temperature of 170° C. or Higher

In an embodiment, the membrane's rupture temperature is ≥170° C., e.g., in the range of 171° C. to 200° C., or 172° C. to 190° C. Rupture temperature is measured as follows. A microporous membrane of 5 cm×5 cm is sandwiched by blocks each having a circular opening of 12 mm in diameter, and a tungsten carbide ball of 10 mm in diameter was placed on the microporous membrane in the circular opening. The membrane is then exposed to an increasing temperature at a rate of 5° C./minute. The membrane's rupture temperature is defined as the temperature at which the ball first breaks through the membrane. The membrane's rupture temperature is defined as the temperature at which the ball completely penetrates the sample, i.e., the temperature at which the sample breaks.

In an embodiment, the rupture temperature is in the range of from 180° C. to 190° C. Since the membrane has a desirably high rupture temperature, it is suitable for use as a battery separator in high-power, high capacity lithium ion batteries such as those used for powering electric vehicles and hybrid electric vehicles.

F. Meltdown Temperature

Meltdown temperature is measured by the following procedure: A rectangular sample of 3 mm×50 mm is cut out of the microporous membrane such that the long axis of the sample is aligned with TD and the short axis is aligned with the MD. The sample is set in the thermomechanical analyzer (TMA/SS6000 available from Seiko Instruments, Inc.) at a chuck distance of 10 mm, i.e., the distance from the upper chuck to the lower chuck is 10 mm. The lower chuck is fixed and a load of 19.6 mN applied to the sample at the upper chuck. The chucks and sample are enclosed in a tube which can be heated. Starting at 30° C., the temperature inside the tube is elevated at a rate of 5° C./minute, and sample length change under the 19.6 mN load is measured at intervals of 0.5 second and recorded as temperature is increased. The temperature is increased to 200° C. The meltdown temperature of the sample is defined as the temperature at which the sample breaks, generally at a temperature in the range of greater than 170° C. to about 200° C.

G. TD and/or MD Heat Shrinkage Ratio at 105° C. of Less than 5.5%

The shrinkage ratio of the microporous membrane in orthogonal planar directions (e.g., TD and MD) at 105° C. is measured as follows:
(i) Measure the size of a test piece of the microporous membrane at ambient temperature in both MD and TD, (ii) equilibrate the test piece of the microporous membrane at a temperature of 105° C. for 8 hours with no applied load, and then (iii) measure the size of the membrane in both MD and TD. The heat (or "thermal") shrinkage ratio in either MD or TD can be obtained by dividing the result of measurement (i) by the result of measurement (ii) and expressing the resulting quotient as a percent.

In an embodiment, the microporous membrane has an MD and TD heat shrinkage ratio at 105° C. in the range of 1.0% to 7.0%, e.g., 2.0% to 4.0%.

H. Tensile Strength

In an embodiment, the membrane has an MD tensile strength ≥90,000 kPa, e.g., in the range of 100,000 to 110,000 kPa, and a TD tensile strength ≥75,000 kPa, e.g., in the range of 80,000 kPa to 100,000 kPa. Tensile strength is measured in MD and TD according to ASTM D-882A.

I. Tensile Elongation ≥100%

Tensile elongation is measured according to ASTM D-882A. In an embodiment, the membrane's MD and TD tensile elongation are each ≥150%, e.g., in the range of 150% to 350%. In another embodiment, the membrane's MD tensile elongation is in the range of, e.g., 150% to 250% and TD tensile elongation is in the range of, e.g., 150% to 250%.

J. Cell Shutdown Under Rapid Heating of 35° C./min.

The cell shutdown under rapid heating is measured by constructing a simplified battery cell according to the following procedure. Two electrodes are prepared by placing Ni foil (30 mm×20 mm) on respective glass sheets 50 mm (W)×80 mm (L)×3 mm (T). The separator is placed between these two electrodes along with a typical electrolyte with a lithium salt, ethylene carbonate and diethyl carbonate with 1 mol/L LiPF$_6$. The cell's AC impedance and temperature at the surface of the cell are monitored as the cell is heated on a hot plate 200 mm (W)*150 mm (L) controlled to heat at a rate of 35° C./min. The Cell Shutdown temperature is attained when the impedance first reaches $1.0 \times 10^4$ (ohm)(cm$^2$).

[5] Battery Separator

In an embodiment, the battery separator formed by the above multilayer, microporous polyolefin membrane has a thickness in the range of about 3 μm to about 200 μm, or about 5 μm to about 50 μm. Depending, e.g., on the choice of electrolyte, separator swelling might increase the final thickness to a value larger than 200 μm.

[6] Battery

The microporous membranes of the invention are useful as battery separators in e.g., lithium ion primary and secondary batteries. Such batteries are described in PCT Patent Publication No. WO 2008/016174.

The battery is useful as a source (or sink) of electric charge to (or from) one or more electrical or electronic components. Such components include passive components such as resistors, capacitors, inductors, including, e.g., transformers; electromotive devices such as electric motors and electric generators, and electronic devices such as diodes, transistors, and integrated circuits. The components can be connected to the battery in series and/or parallel electrical circuits to form a battery system. The circuits can be connected to the battery directly or indirectly. For example, electrical energy produced by the battery can be converted electrochemically (e.g., by a second battery or fuel cell) and/or electromechanically (e.g., by an electric motor operating an electric generator) before the electrical energy is dissipated or stored in a one or more of the components. The battery system can be used as a power source for powering relatively high power devices such as electric motors for driving power tools and electric or hybrid electric vehicles.

The invention includes the following non-limiting embodiments.

1. A microporous membrane comprising layers, wherein at least one layer comprises a first polymer having a Tm in the range of 115.0° C. to 130.0° C. and an Mw of from $5.0 \times 10^3$ to $4.0 \times 10^5$, and the membrane has a shutdown temperature ≤130.5° C. and a rupture temperature ≥170.0° C.
2. The membrane of embodiment 1, wherein the first polymer is a polyolefin having a 115.0° C.≤Tm≤130.0° C.
3. The membrane of embodiment 1 or 2, wherein the first polymer is an ethylene/α-olefin copolymer having a Tm of ranging from 121.0 to 125.0° C., and wherein at least a second layer of the membrane comprises polypropylene having an Mw≥$5.0 \times 10^5$ and a Tm≥150° C.
4. The membrane of embodiment 1 or 3 having an air permeability ≤700 seconds/100 cm3/20 μm.
5. The membrane of embodiment 3 or 4, wherein the membrane further comprises a third layer, the third layer comprising the ethylene/α-olefin copolymer, wherein the second layer is located between the first and third layers.
6. The membrane of embodiment 1 or 5, wherein the first and third layers each individually comprise from 3 wt. % to 50 wt. %, based on the weight of the respective first layer or third layer, of the ethylene/α-olefin copolymer, and the second layer comprises ≤40 wt. % of the polypropylene based on the weight of the second layer.

7. The membrane of embodiment 5 or 6, wherein the first and third layers each individually further comprise from 40.0 wt. % to 97.0 wt. %, based on the weight of the respective first layer or third layer, of a polyethylene having an Mw≤1.0×10⁶ and from 0 wt. % to 25.0 wt. % of polyethylene having a Mw>1.0×10⁶; and the second layer further comprises polyethylene.

8. The membrane of embodiment 7, wherein the second layer comprises 15.0 wt. % to 40.0 wt. % of the polypropylene, 0 wt. % to 10.0 wt. % of polyethylene having an Mw>1.0× 10⁶, and 50.0 wt. % to 85.0 wt. % of polyethylene having an Mw≤1.0×10⁶, the weight percents being based on the weight of the second layer.

9. The microporous membrane of any of embodiments 3 to 8, wherein the ethylene/α-olefin copolymer has a comonomer content in the range of from about 1.0 to 5.0 mol. %, and wherein the comonomer is hexene or octene.

10. The microporous membrane of any of embodiments 3 to 9, wherein the microporous membrane has a normalized air permeability in the range of from about 50.0 to about 7.00×10² seconds/100 cm³/20 μm.

11. The microporous membrane of any of embodiments 1 to 10, wherein the microporous membrane attains a surface impedance of 1.0×10⁴ (ohm)(cm²) at a temperature ≤175° C. when subjected to heating at a rate of 35° C./min.

12. The microporous membrane of any of embodiments 1 to 11, wherein the microporous membrane has a surface impedance of 1.0×10⁴ (ohm)(cm²) at a temperature of 150° C. to 160° C. when subjected to heating at a rate of 35° C./min.

13. The microporous membrane of any of embodiments 1 to 12, wherein the microporous membrane has a pin puncture strength ≥3000 mN/20 μm and a porosity of 20 to 50%.

14. A multilayer microporous membrane, first and third layers individually comprising 20.0 wt. % to 30.0 wt. % of an ethylene/α-olefin copolymer having an Mw from 1.0×10⁴ to 7.0×10⁴, 45.0 wt. % to 70.0 wt. % of an polyethylene having an Mw≤1.0×10⁶, and 0.0 wt. % to 35.0 wt. % of a polyethylene having an Mw>1.0×10⁶; based on the weight of the first and third layers, respectively, and a second layer located between the first and third layers, comprising 20.0% to 80.0 wt. % of a polypropylene having an Mw of 1.0×10⁶ and a heat of fusion >110.0 J/g, 0 wt. % to 10.0 wt. % of a polyethylene having an Mw>1.0×10⁶ and 20.0 wt. % to 70.0 wt. % of a polyethylene having an Mw≤1.0×10⁶, the weight percents being based on the weight of the second layer; the membrane having a shutdown temperature ≤130.5° C. and a rupture temperature ≥170.0° C.

15. A method for producing a microporous membrane, comprising,
  a. combining at least a first polymer and at least one first diluent, the first polymer comprising a polymer having a Tm in the range of from 115.0° C. to 130.0° C. and an Mw in the range of 5.0×10³ to 4.0×10⁵;
  b. combining at least a polypropylene and at least a second diluent, the polypropylene having an Mw≥1.0×10⁶;
  c. forming a multilayer extrudate from the combined first polymer, the polypropylene and the diluents, the extrudate having a first layer containing the first polyethylene, a second layer containing the third polyethylene, and a second layer located between the first and third layers containing the polypropylene; and
  d. removing at least a portion of the first, second, and third diluents from the stretched multilayer extrudate to produce the membrane.

16. The method of embodiment 15, further comprising combining at least a third polymer comprising a polymer having a Tm in the range of from 115.0° C. to 130.0° C. and an Mw in the range of from 5.0×10³ to 4.0×10⁵ with at least one third diluent 17. The method of embodiment 15 or 16, wherein the first and third polymers comprise a polyolefin.

18. The method of any of embodiments 15 to 17, wherein the first polymer comprises an ethylene/α-olefin copolymer having a Tm of ranging from 121.0 to 125.0° C., and wherein the second polypropylene comprises a polypropylene having an Mw≥5.0×10⁵ and a Tm >150° C.

19. The method of any of embodiments 15 to 18, further comprising stretching the extrudate before step (d) and removing at least a portion of any volatile species from the membrane during or after step (d).

20. The method of any of embodiments 16 to 19, wherein:
  (a) the amount of first polymer combined with first diluent is in the range of about 15 to 40 wt. % and the amount of first diluent is in the range of 85 to 60 wt. %, both weight percents being based on the combined first polymer and first diluent;
  (b) the amount of third polymer combined with third diluent is in the range of about 15 to 40 wt. % and the amount of third diluent is in the range of 85 to 60 wt. %, both weight percents being based on the combined third polymer and third diluent; and
  (c) the amount of the polypropylene combined with second diluent is in the range of about 15 to 40 wt. % and the amount of second diluent is in the range of 85 to 60 wt. %, both weight percents being based on the combined polypropylene and second diluent.

21. The method of any of embodiments 15 to 20, wherein the multilayer extrudate further comprises a polyethylene having an Mw>1.0×10⁶.

22. The method of any of embodiments 15 to 21, wherein the multilayer extrudate further comprises a polyethylene having an Mw≤1.0×10⁶.

23. The method of embodiment 16, wherein the first and third layers contain 3.0 to 50.0 wt. % of the polymer having a Tm in the range of from 115.0° C. to 130.0° C. and an Mw in the range of from 5.0×10³ to 4.0×10⁵, 0 to 25.0 wt. % of polyethylene having an Mw>1.0×10⁶, and 40.0 to 97.0 wt. % of a polyethylene having an Mw≤1.0×10⁶, based on the total weight of polyolefin in the first and third layers respectively; and the second layer contains 15.0 to 40.0 wt. % of the polypropylene, and 0 to 10.0 wt. % of an independently selected polyethylene having an Mw>1.0×10⁶, and 50.0 to 85.0 wt. % of a polyethylene having an Mw≤1.0×10⁶, based on the total weight of polyolefin in the second layer, wherein the first, second and third diluents are the same.

24. The method of embodiment 23, wherein the polyethylene having an Mw>1.0×10⁶ in the first and third layers is the same as the polyethylene having an Mw>1.0×10⁶ in the second layer.

25. The method of any of embodiments 15 to 24, further comprising cooling the multilayer extrudate following step (c).

26. The method of embodiment 25, further comprising stretching the membrane in at least one direction.

27. The method of embodiment 26, wherein the membrane stretching is conducted while the membrane is exposed to a temperature in the range of 90° C. to 135° C.

28. A multilayer membrane made by the method of any of embodiments 15 to 27.

29. A battery comprising an anode, a cathode, an electrolyte, and a multilayer microporous membrane comprising an ethylene/α-olefin copolymer having an Mw of from $5.0 \times 10^3$ to $4.0 \times 10^5$, the membrane having a shutdown temperature <130.5° C. and a rupture temperature ≥to 170° C., wherein the multilayer microporous membrane separates at least the anode from the cathode.
30. The battery of embodiment 29, wherein the electrolyte contains lithium ions and the battery is a secondary battery.
31. The battery of embodiment 29 or 30, further comprising one or more resistive and/or reactive components electrically, electrochemically, and/or electromechanically connected to the battery to form a battery system, wherein the battery is a source or sink of power to the component(s).
32. The battery system of embodiment 31, wherein at least one component comprises means for moving an electric vehicle or hybrid electric vehicle.
33. The battery system of embodiment 31 or 32, wherein the means comprise an electric motor and/or an electric motor, and the battery is electrically connected to the motor.

[7] EXAMPLES

The present invention will be explained in more detail referring to the following non-limiting examples.

Example 1

(1) Preparation of First Polyolefin Solution

A first polymer composition (P1) is prepared by dry-blending (a) 25.0 wt. % of a polyethylene (produced using a single site catalyst) having a melt index of 253 g/10 min (MI, determined according to ASTM D-1238, Condition 190° C./2.16 kg (formally known as "Condition (E)" and also known as $I_2$), an MWD of 2.5, and a Tm of 122.0° C., (b) 57.0 wt. % of a polyethylene resin (HDPE) having an Mw of $5.6 \times 10^5$ and an MWD of 4.05, and (c) 18.0 wt. % of a polyethylene resin (UHMWPE) having an Mw of $2.0 \times 10^6$ and an MWD of 5.1

25 wt. % of the resultant first polymer composition is charged into a strong-blending double-screw extruder having an inner diameter of 58 mm and L/D of 42, and 75 wt. % of liquid paraffin (50 cst at 40° C.) is supplied to the double-screw extruder via a side feeder to produce a first polymer solution. The weight percents are based on the weight of the first polymer solution. Melt-blending is conducted at 210° C. and 200 rpm.

(2) Preparation of Second Polyolefin Solution

A second polymer composition (P2) is prepared by dry-blending (a) 68.6 wt. % of a polyethylene resin (HDPE) having an Mw of $5.6 \times 10^5$, an MWD of 4.05, a Tc of 135° C., and a Tcd of 100° C., (b) 1.4 wt. % of a polyethylene resin (UHMWPE) having an Mw of $2.0 \times 10^6$ and an MWD of 5.1, and (c) 30 wt. % of a polypropylene resin having an Mw of $1.1 \times 10^6$, a heat of fusion of 114 J/g and an MWD of 5, the percentages being based on the weight of the second polymer composition.

30 wt. % of P2 is charged into a second strong-blending double-screw extruder having an inner diameter of 58 mm and L/D of 42, and 75 wt. % of liquid paraffin (50 cst at 40° C.) is supplied to the double-screw extruder via a side feeder to produce the second polymer solution. The weight percents are based on the weight of the second polyolefin solution. Melt-blending is conducted at 210° C. and 200 rpm.

A third polymer composition (P3) is prepared by dry-blending (a) 25.0 wt. % of polyethylene (produced using a single site catalyst) having a melt index of 253 g/10 min (MI, determined according to ASTM D-1238, Condition 190° C./2.16 kg (formally known as "Condition (E)" and also known as $I_2$), an MWD of 2.5 and a Tm of 122.0° C., (b) 57.0 wt. % of a polyethylene resin (HDPE) having an Mw of $5.6 \times 10^5$ and an MWD of 4.05, and (c) 18.0 wt. % of a polyethylene resin (UHMWPE) having an Mw of $2.0 \times 10^6$ and an MWD of 5.1.

25 wt. % of the resultant third polymer composition is charged into a strong-blending double-screw extruder having an inner diameter of 58 mm and L/D of 42, and 75 wt. % of liquid paraffin (50 cst at 40° C.) is supplied to the double-screw extruder via a side feeder to produce a third polymer solution. The weight percents are based on the weight of the third polymer solution. Melt-blending is conducted at 210° C. and 200 rpm.

(3) Membrane Production

The first, second, and third polymer solutions are supplied from their respective double-screw extruders to a three-layer-extruding T-die, and extruded therefrom to produce a layered extrudate (also called a laminate) of first polymer solution layer/second polymer solution layer/third polymer solution layer at a layer thickness ratio of 45.3/9.4/45.3. Alternatively, where the polymer in the first and third layers is the same, only a first or third polymer solution need be used and that solution may be fed into the die to produce the membrane using only two extruders. The extrudate is cooled while passing through cooling rollers controlled at 20° C., producing an extrudate in the form of a three-layer gel-like sheet. The gel-like sheet is biaxially stretched (simultaneously) in MD and TD while exposed to a temperature of 113° C. (the "biaxial stretching temperature") to a magnification of 5 fold in each of MD and TD by a tenter-stretching machine. The stretched three-layer gel-like sheet is fixed to an aluminum frame of 20 cm×20 cm, immersed in a bath of methylene chloride controlled at 25° C. for three minutes to remove the liquid paraffin, and dried by air flow at room temperature to produce a dried membrane. The dried membrane is then dry stretched. Before dry stretching, the dried membrane has an initial dry length (MD) and an initial dry width (TD). The dried membrane is first dry-stretched in TD to a magnification of 1.4 fold while exposed to a temperature of 118.7° C. (the "TD stretching temperature"), resulting in a second dry length. The membrane's width (MD) remains approximately equal to the initial dry width during the TD dry stretching. Following TD dry-stretching, the membrane is subjected to a controlled reduction in width (TD) from the second dry width to a final magnification of 1.2 fold, the final magnification being based on the initial width of the membrane at the start of dry stretching, while exposed to a temperature of at 118.7° C. (the "width reduction temperature"). The membrane's length (MD) remains approximately equal to the second dry length during the width reduction. The membrane, which remains fixed to the batch-stretching machine, is then heat-set while exposed to a temperature of 118.7° C. (the "heat set temperature") for 10 minutes to produce the final multilayer microporous membrane.

Example 2

Example 1 is repeated except the biaxial stretching temperature is 115.0° C.; and the TD dry stretching to a magnification of 1.6 fold at a TD stretching temperature of 118.9° C.

Comparative Example 1

(1) Preparation of First Polyolefin solution

A first polyolefin composition is prepared by dry-blending: (a) 68.6 wt. % of a first polyethylene resin having an Mw of $5.62 \times 10^5$, an MWD of 4.05, a Tm of 135° C. and a Tcd of 100° C.; (b) 1.4 wt. % of a polyethylene resin having an Mw of $1.95 \times 10^6$ and an MWD of 5.09; and (c) 30 wt. % of a polypropylene resin having an Mw of $1.1 \times 10^6$, a heat of fusion of 114 J/g and an MWD of 5.0, the percentages being based on the weight of the first polyolefin composition.

30 wt. % of the resultant first polyolefin composition is charged into a strong-blending double-screw extruder having an inner diameter of 58 mm and L/D of 42, and 70 wt. % of liquid paraffin (50 cst at 40° C.) is supplied to the double-screw extruder via a side feeder to produce a first polyolefin solution. The weight percents are based on the weight of the first polyolefin solution. Melt-blending is conducted at 210° C. and 200 rpm.

(2) Preparation of Second Polyolefin Solution

A second polyolefin solution is prepared in the same manner as above by dry-blending (a) 82 wt. % of a first polyethylene resin having an Mw of $5.62 \times 10^5$, an MWD of 4.05, a Tm of 135° C. and a Tcd of 100° C., and (b) 18 wt. % of a polyethylene resin having an Mw of $1.95 \times 10^6$ and an MWD of 5.09, the percentages being based on the weight of the second polyolefin composition.

25 wt. % of the resultant second polyolefin composition is charged into a strong-blending double-screw extruder having an inner diameter of 58 mm and L/D of 42, and 70 wt. % of liquid paraffin (50 cst at 40° C.) is supplied to the double-screw extruder via a side feeder to produce the second polyolefin solution. The weight percents are based on the weight of the second polyolefin solution. Melt-blending is conducted at 210° C. and 200 rpm.

(3) Membrane Production

The first and second polyolefin solutions are supplied from their respective double-screw extruders to a three-layer-extruding T-die, and extruded therefrom to produce a layered extrudate (also called a laminate) of second polyolefin solution layer/first polyolefin solution layer/second polyolefin solution layer at a layer thickness ratio of 45.3/9.4/45.3. The extrudate is cooled while passing through cooling rollers controlled at 20° C., producing an extrudate in the form of a three-layer gel-like sheet. The gel-like sheet is heated to a temperature of 115.5° C. for 129 secs. before being biaxially stretched (simultaneously) in MD and TD while exposed to a temperature of 115.5° C. (the "biaxial stretching temperature") to a magnification of 5 fold in each of MD and TD at a deformation speed of 880%/min. by a tenter-stretching machine. The stretched gel-like sheet is heat treated at 95.0° C. for 16 secs. The stretched three-layer gel-like sheet is fixed to an aluminum frame of 20 cm×20 cm, immersed in a bath of methylene chloride controlled at 25° C. for three minutes to remove the liquid paraffin, and dried by air flow at room temperature to produce a dried membrane.

Before dry stretching, the dried membrane has an initial dry length (MD) and an initial dry width (TD). The dried membrane is dry-stretched in TD to a magnification of 1.6 fold while exposed to a temperature of 127.3° C., resulting in a second dry width. The membrane's length (MD) remains approximately equal to the initial dry length during the TD dry stretching. Following TD dry-stretching, the membrane is subjected to a controlled reduction in width (TD) from the second dry width to a final magnification of 1.3 fold, the final magnification being based on the initial width of the membrane at the start of dry stretching, while exposed to a temperature of at 127.3° C. (the "width reduction temperature"). The membrane's length (MD) remains approximately equal to the second dry length during the width reduction. The membrane, which remains fixed to the batch-stretching machine, is then heat-set while exposed to a temperature of 127.3° C. (the "heat set temperature") for 10 minutes to produce the final multilayer microporous membrane. The dried membrane is then dry stretched.

Comparative Example 2

Comparative Example 2 is a commercially available multilayer separator made by a dry process comprising polyethylene and polypropylene. The separator of comparative example 2 has a thickness of 19.1 μm, a normalized air permeability of 435, a pin puncture strength of 3.04 kPa (310 gf), a heat shrinkage at 105° C. of 0% and reaches an impedence of $1.0 \times 10^4$ (ohm)(cm$^2$) at a temperature of 176° C.

TABLE 1

| No. | Example 1 | Example 2 | Comparative Example 1 |
|---|---|---|---|
| Extrudate | | | |
| Layer structure[2] | (I)/(II)/(III) | (I)/(II)/(III) | (I)/(II)/(I) |
| Layer thickness ratio | 45.3/9.4/45.3 | 45.3/9.4/45.3 | 45.3/9.4/45.3 |
| Stretching of Gel-Like sheet | | | |
| Temperature (° C.) | 113 | 115 | 115.5 |
| Magnification (MD × TD)[3] | 5 × 5 | 5 × 5 | 5 × 5 |
| Stretching of dried membrane | | | |
| Temperature (° C.) | 118.7 | 118.9 | 127.3 |
| Magnification (TD) | 1.4 | 1.5 | 1.6 |
| Relaxation of re-stretched membrane Temperature (° C.) | 118.7 | 118.9 | 127.3 |
| Final magnification (TD) | 1.2 | 1.3 | 1.4 |
| Heat setting treatment | | | |
| Temperature (° C.) | 118.7 | 118.9.0 | 127.3 |
| Time (min) | 10 | 10 | 10 |

TABLE 2

| PROPERTIES | Ex. 1 | Ex. 2 | Comp. Ex. 1 |
|---|---|---|---|
| Thickness μm | 25.5 | 20.9 | 25.0 |
| Normalized Air Perm. (s/100 cc/20μ) | 472 | 356 | 267 |
| Porosity % | 37.9 | 37.1 | 46.2 |
| Punct. Strength (mN/20 μm) | 3903 | 3776 | 2323 |
| Tensile Strength | $10.1 \times 10^4$ | $9.61 \times 10^4$ | $10.8 \times 10^4$, |
| MD, TD | $10.4 \times 10^4$ | $10.1 \times 10^4$ | $13.2 \times 10^4$ |
| Tensile Elongation MD, TD (%) | 155, 155 | 150, 145 | 199, 170 |
| Heat Shrinkage (%) @ 105° C. MD, TD | 6.5, 2.9 | 6.7, 3.5 | 3.6, 1.0 |
| Temp ° C. @ impedance of $1.0 \times 10^4$ (ohm)(cm$^2$) | 157 | 159 | 164 |
| Shutdown Temp. ° C. | 128 | 128 | 134 |
| Rupture Temp. ° C. | 185 | 185 | 188 |

It is noted from Table 2 that the microporous membranes of Examples 1 and 2 exhibit well-balanced important properties, including a shutdown of less than 128° C. and a rupture temperature of 185° C. Compared to membranes of Comparative Example 1, inventive Examples 1 and 2 shutdown at lower temperature while maintaining comparable rupture temperature. Examples 1 and 2 also reach a surface impedance of $1.0 \times 10^4$ (ohm)(cm$^2$) under relatively fast heating at 35° C./min at temperatures well below those of Comparative Examples 1 and 2.

All patents, test procedures, and other documents cited herein, including priority documents, are fully incorporated by reference to the extent such disclosure is not inconsistent and for all jurisdictions in which such incorporation is permitted.

While the illustrative forms disclosed herein have been described with particularity, it will be understood that various other modifications will be apparent to and can be readily made by those skilled in the art without departing from the spirit and scope of the disclosure. Accordingly, it is not intended that the scope of the claims appended hereto be limited to the examples and descriptions set forth herein but rather that the claims be construed as encompassing all the features of patentable novelty which reside herein, including all features which would be treated as equivalents thereof by those skilled in the art to which this disclosure pertains.

When numerical lower limits and numerical upper limits are listed herein, ranges from any lower limit to any upper limit are contemplated.

What is claimed is:

1. A microporous membrane comprising layers, wherein:
   1) at least one layer comprises a first polymer comprising an ethylene/α-olefin copolymer having a Tm of 121.0 to 125.0° C. and an Mw of $5.0 \times 10^3$ to $4.0 \times 10^5$,
   2) at least a second layer of the membrane comprises 15 wt. % to 40 wt. % of polypropylene having an Mw≥$5.0 \times 10^5$ and a Tm≥150° C., 0 wt. % to 10 wt. % of polyethylene having an Mw>$1.0 \times 10^6$, and 50 wt. % to 85 wt. % of polyethylene having an Mw≤$1.0 \times 10^6$, the weight percents being based on the weight of the second layer,
   3) a third layer comprises the ethylene/α-olefin copolymer,
   4) the second layer is located between the first and third layers,
   5) the first and third layers each individually comprise from 3 wt. % to 50 wt. %, based on the weight of the respective first layer or third layer, and
   6) the membrane has a shutdown temperature ≤130.5° C., a rupture temperature ≥170.0° C. and a normalized air permeability ≤700 seconds/100 cm$^3$/20 μm.

2. The microporous membrane of claim 1, wherein the ethylene/α-olefin copolymer has a comonomer content in the range of from about 1.0 to 5.0 mol. %, and wherein the comonomer is hexene or octene.

3. The microporous membrane of claim 1, wherein the microporous membrane has a normalized air permeability in the range of from about 50.0 to about $7.00 \times 10^2$ seconds/100 cm$^3$/20 μm.

4. The microporous membrane of claim 1, wherein the microporous membrane attains a surface impedance of $1.0 \times 10^4$ (ohm)(cm$^2$) at a temperature ≤175° C. when subjected to heating at a rate of 35° C./min.

5. The microporous membrane of claim 1, wherein the microporous membrane has a surface impedance of $1.0 \times 10^4$ (ohm)(cm$^2$) at a temperature of 150° C. to 160° C. when subjected to heating at a rate of 35° C./min.

6. The microporous membrane of claim 1, wherein the microporous membrane has a normalized pin puncture strength ≥3000 mN/20 μm and a porosity of 20 to 50%.

7. A multilayer microporous membrane,
   first and third layers individually comprising 20.0 wt. % to 30.0 wt. % of an ethylene/α-olefin copolymer having an Mw from $1.0 \times 10^4$ to $7.0 \times 10^4$, 45.0 wt. % to 70.0 wt. % of an polyethylene having an Mw≤$1.0 \times 10^6$, and 0.0 wt. % to 35.0 wt. % of a polyethylene having an Mw>$1.0 \times 10^6$; based on the weight of the first and third layers, respectively, and
   a second layer located between the first and third layers, comprising 20.0 wt. % to 80.0 wt. % of a polypropylene having an Mw of $1.1 \times 10^6$ and a heat of fusion >110.0 J/g, 0 wt. % to 10.0 wt. % of a polyethylene having an Mw>$1.0 \times 10^6$ and 20.0 wt. % to 70.0 wt. % of a polyethylene having an Mw>$1.0 \times 10^6$, the weight percents being based on the weight of the second layer; the membrane having a shutdown temperature ≤130.5° C. and a rupture temperature ≥170.0° C.

8. A method of producing a microporous membrane comprising:
   a. combining at least a first polymer and at least one first diluent, the first polymer comprising an ethylene/α-olefin copolymer having a Tm of 121.0° C. to 125.0° C. and an Mw of $5.0 \times 10^3$ to $4.0 \times 10^5$;
   b. combining at least a second polymer and at least a second diluent, the second polymer comprising a polypropylene having an Mw≥$5.0 \times 10^5$ and a Tm≥150° C., a polyethylene having an Mw>$1.0 \times 10^6$ and a polyethylene having an Mw≤$1.0 \times 10^6$, wherein the amount of polypropylene is 15 wt. % to 40 wt. %, the amount of polyethylene having an Mw>$1.0 \times 10^6$ is 0 wt. % to 10 wt. % and the amount of polyethylene having an Mw 50 wt. % to 85 wt. %, the weight percents being based on the total polymer weight of the composition;
   c. combining at least a third polymer comprising an ethylene/α-olefin copolymer having a Tm of 121.0° C. to 125.0° C. and an Mw of $5.0 \times 10^3$ to $4.0 \times 10^5$ with at least one third diluent;
   d. forming a multilayer extrudate from the combined first polymer, the polypropylene second polymer and the diluents, the extrudate having a first layer containing the first polymer, a second layer containing the second polymer, and a second layer located between the first and third layers containing the first polymer; and
   e. removing at least a portion of the first, second, and third diluents from the stretched multilayer extrudate to produce the membrane.

9. The method of claim 8, further comprising combining at least a third polymer comprising a polymer having a Tm in the range of from 115.0° C. to 130.0° C. and an Mw in the range of from $5.0 \times 10^3$ to $4.0 \times 10^5$ with at least one third diluent.

10. The method of claim 8, wherein the first and third polymers comprise a polyolefin.

11. The method of claim 8, wherein the first polymer comprises an ethylene/α-olefin copolymer having a Tm of ranging from 121.0 to 125.0° C., and wherein the second polypropylene comprises a polypropylene having an Mw≥$5.0 \times 10^5$ and a Tm≥150° C.

12. The method claim 8, further comprising stretching the extrudate before step (d) and removing at least a portion of any volatile species from the membrane during or after step (d).

13. The method of claim 9, wherein:
   (a) the amount of first polymer combined with first diluent is in the range of about 15 to 40 wt. % and the amount of first diluent is in the range of 85 to 60 wt. %, both weight percents being based on the combined first polymer and first diluent;
   (b) the amount of third polymer combined with third diluent is in the range of about 15 to 40 wt. % and the amount of third diluent is in the range of 85 to 60 wt. %, both weight percents being based on the combined third polymer and third diluent; and
   (c) the amount of the polypropylene combined with second diluent is in the range of about 15 to 40 wt. % and the amount of second diluent is in the range of 85 to 60 wt. %, both weight percents being based on the combined polypropylene and second diluent.

14. The method of claim 8, wherein the multilayer extrudate further comprises a polyethylene having an Mw≥$1.01 \times 10^6$.

15. The method of claim 8, wherein the multilayer extrudate further comprises a polyethylene having an Mw≤1.0×10⁶.

16. The method of claim 9, wherein:
the first and third layers contain 3 to 50 wt. % of the polymer having a Tm in the range of from 115.0° C. to 130.0° C. and an Mw in the range of from 5.0×10³ to 4.0×10⁵, 0 to 25 wt. % of polyethylene having an Mw≥1.0×10⁶, 40 to 97 wt. % of a polyethylene having an Mw≤1.0×10⁶, based on the total weight of polyolefin in the first and third layers respectively; and
the second layer contains 15 to 40 wt. % of the polypropylene, and 0 to 10 wt. % of an independently selected polyethylene having an Mw≥1.0×10⁶, and 50 to 85 wt. % of a polyethylene having an Mw≤1.0×10⁶, based on the total weight of polyolefin in the second layer,
wherein the first, second, and third diluents are the same.

17. The method of claim 16, wherein the polyethylene having an Mw≥1.0×10⁶ in the first and third layers is the same as the polyethylene having an Mw≥1.0×10⁶ in the second layer.

18. The method of claim 8, further comprising cooling the multilayer extrudate following step (c).

\* \* \* \* \*

UNITED STATES PATENT AND TRADEMARK OFFICE
CERTIFICATE OF CORRECTION

PATENT NO. : 8,709,641 B2  Page 1 of 1
APPLICATION NO. : 13/259195
DATED : April 29, 2014
INVENTOR(S) : Ishihara et al.

It is certified that error appears in the above-identified patent and that said Letters Patent is hereby corrected as shown below:

In the Claims

In Column 23

Claim 1, at line 31, after "third layer" please insert -- of the ethylene/α-olefin copolymer --.

Signed and Sealed this
Fifth Day of August, 2014

Michelle K. Lee
*Deputy Director of the United States Patent and Trademark Office*